(12) United States Patent
Lo et al.

(10) Patent No.: US 12,523,913 B2
(45) Date of Patent: Jan. 13, 2026

(54) REFLECTIVE DISPLAY DEVICE

(71) Applicant: E Ink Holdings Inc., Hsinchu (TW)

(72) Inventors: Po-Yuan Lo, Hsinchu (TW); Ian French, Hsinchu (TW); Somnath Mondal, Hsinchu (TW); Jau-Min Ding, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 433 days.

(21) Appl. No.: 18/177,100

(22) Filed: Mar. 1, 2023

(65) Prior Publication Data

US 2023/0359099 A1    Nov. 9, 2023

(30) Foreign Application Priority Data

May 6, 2022   (TW) .................................. 111117080

(51) Int. Cl.
*G02F 1/1677* (2019.01)
*G02F 1/1335* (2006.01)
*G02F 1/167* (2019.01)
*G02F 1/16757* (2019.01)

(52) U.S. Cl.
CPC ...... *G02F 1/1677* (2019.01); *G02F 1/133514* (2013.01); *G02F 1/167* (2013.01); *G02F 1/16757* (2019.01); *G02F 2201/08* (2013.01); *G02F 2202/36* (2013.01); *G02F 2203/02* (2013.01)

(58) Field of Classification Search
CPC .. G02F 1/1677; G02F 1/133514; G02F 1/167; G02F 1/16757; G02F 2201/08; G02F 2202/36; G02F 2203/02; G02F 2203/055; G02F 1/1335

USPC .................................................. 359/245–297
See application file for complete search history.

(56) References Cited

U.S. PATENT DOCUMENTS

| | | | |
|---|---|---|---|
| 9,632,306 | B2 | 4/2017 | Lee et al. |
| 10,211,227 | B2 | 2/2019 | Kim et al. |
| 10,551,672 | B2 | 2/2020 | Yoon et al. |
| 10,558,100 | B2 | 2/2020 | Lee et al. |
| 10,714,540 | B2 | 7/2020 | Kim et al. |

(Continued)

FOREIGN PATENT DOCUMENTS

| | | | |
|---|---|---|---|
| TW | 201621441 A | 6/2016 |
| TW | I554816 B | 10/2016 |

(Continued)

OTHER PUBLICATIONS

The Notice of Allowance of corresponding TW application No. 111117080 issued on Apr. 27, 2023.

*Primary Examiner* — Marin Pichler
*Assistant Examiner* — Kuei-Jen L Edenfield
(74) *Attorney, Agent, or Firm* — CKC & Partners Co., LLC (57) ABSTRACT

A reflective display device includes an electrophoretic display (EPD) module, an optical layer, a color filter layer, and at least one quantum dot (QD). The optical layer is located above the electrophoretic display module. The color filter layer is located on the optical layer. The quantum dot is located between the optical layer and the electrophoretic display module. When first light passes through the optical layer and transmits to the quantum dot, the quantum dot emits second light, and the electrophoretic display module is configured to reflect the second light to irradiate outwards from the color filter layer.

12 Claims, 9 Drawing Sheets

(56) References Cited

U.S. PATENT DOCUMENTS

| | | | |
|---|---|---|---|
| 10,725,333 | B2 | 7/2020 | Kim et al. |
| 11,158,683 | B2 | 10/2021 | Ahn et al. |
| 2015/0138246 | A1* | 5/2015 | Lo .................. G09G 3/3607 345/690 |
| 2016/0041429 | A1* | 2/2016 | Wang ............ G02F 1/133555 349/61 |
| 2017/0031227 | A1* | 2/2017 | Lo ........................ G02F 1/00 |
| 2017/0153526 | A1* | 6/2017 | Okabe .................. G02F 1/167 |
| 2018/0012909 | A1 | 1/2018 | Kim et al. |
| 2019/0278149 | A1* | 9/2019 | Crounse ............. G02F 1/1676 |
| 2019/0302548 | A1* | 10/2019 | Lee ................ G02F 1/136209 |
| 2020/0388651 | A1 | 12/2020 | Woo |

FOREIGN PATENT DOCUMENTS

| | | |
|---|---|---|
| TW | I570496 B | 2/2017 |
| TW | I677743 B | 11/2019 |

\* cited by examiner

REFLECTIVE DISPLAY DEVICE

RELATED APPLICATIONS

This application claims priority to Taiwan Application Serial Number 111117080, filed May 6, 2022, which is herein incorporated by reference.

BACKGROUND

Field of Invention

The present disclosure relates to a flexible substrate and a reflective display device.

Description of Related Art

In today's market full of a wide variety of consumer electronic products, reflective display devices, e.g. electronic papers, now have extensively utilized as display screens. A display medium layer of a reflective display device is formed of the main elements of microcapsules that have white and black charged particles. The white and black charged particles are driven to move by applying a voltage to the display medium layer, such that each pixel displays a black color, a white color or a gray level. Since the reflective display device utilizes incident light that irradiates the display medium layer to achieve the purpose of display, the reflective display needs no backlight to reduce power consumption.

In order to enable the reflective display device to show a color image, a color resist (color photoresist) is usually disposed above an electrophoretic display module, so that incident light can form light having a specific color after passing through the color resist, and then the light passes through the color resist again after being reflected by the display medium layer. However, the color resist would reduce the amount of light. For example, when the incident light is transmitted to the electrophoretic display module through the color resist, only about 24% of the light is reflected by the electrophoretic display module, After the light reflected by the electrophoretic display module passes through the color resist again, only about 10% reflectivity remains. Therefore, it is difficult to improve the brightness of the reflective display device used to display color images.

SUMMARY

One aspect of the present disclosure provides a reflective display device.

According to some embodiments of the present disclosure, a reflective display device includes an electrophoretic display (EPD) module, an optical layer, a color filter layer, and at least one quantum dot (QD). The optical layer is located above the electrophoretic display module. The color filter layer is located on the optical layer. The quantum dot is located between the optical layer and the electrophoretic display module. When first light passes through the optical layer and transmits to the quantum dot, the quantum dot emits second light, and the electrophoretic display module is configured to reflect the second light to irradiate outwards from the color filter layer.

In some embodiments, the color filter layer includes at least one color resist, and the color resist has an opening to expose the optical layer.

In some embodiments, the opening of the color resist is configured to enable the first light to pass through.

In some embodiments, a fill rate of the color resist on the optical layer is in a range from 40% to 80%.

In some embodiments, the color resist is red, green, blue, or yellow.

In some embodiments, when the color resist is red, a diameter of the quantum dot is in a range from 4 nm to 5 nm.

In some embodiments, when the color resist is blue, a diameter of the quantum dot is in a range from 1.8 nm to 2.2 nm.

In some embodiments, the quantum dot is configured to absorb a light having a wavelength in a range from 380 nm to 420 nm.

In some embodiments, the electrophoretic display module comprises a plurality of microcapsules or a plurality of microcups.

In some embodiments, the quantum dot is located above the microcapsules or the microcups.

Another aspect of the present disclosure provides a reflective display device.

According to some embodiments of the present disclosure, a reflective display device includes an electrophoretic display module, an optical layer, a color filter layer, and at least one quantum dot. The color filter layer is located on a top surface of the optical layer and includes at least one color resist, wherein the color resist has an opening to expose the optical layer. The quantum dot is located between a bottom surface of the optical layer and the electrophoretic display module, wherein when a first light passes through the optical layer and transmits to the quantum dot, the quantum dot emits a second light, and the electrophoretic display module is configured to reflect the second light to irradiate outwards from the color filter layer.

In some embodiments, the opening of the color resist is configured to enable the first light to pass through.

In some embodiments, a fill rate of the color resist on the optical layer is in a range from 40% to 80%.

In some embodiments, the color resist is red, green, blue, or yellow.

In some embodiments, when the color resist is red, a diameter of the quantum dot is in a range from 4 nm to 5 nm.

In some embodiments, when the color resist is blue, a diameter of the quantum dot is in a range from 1.8 nm to 2.2 nm.

In some embodiments, the quantum dot is configured to absorb a light having a wavelength in a range from 380 nm to 420 nm.

In some embodiments, the electrophoretic display module comprises a plurality of microcapsules or a plurality of microcups.

In some embodiments, the quantum dot is located above the microcapsules or the microcups.

In the aforementioned embodiments of the present disclosure, since the reflective display device has the quantum dot that is between the optical layer and the electrophoretic display module, when the first light passes through the optical layer and transmits to the quantum dot, the quantum dot can emit the second light having a specific wavelength, and the second light can be reflected by the electrophoretic display module below the quantum dot, such that the second light is reflected to irradiate outwards from the color filter layer. The configuration of the quantum dot may increase the light transmitting to the electrophoretic display module (e.g., 30% to 50% of an incident light), thereby improving the reflectivity of the entire reflective display device (e.g., 12% to 20%). The reflectivity of the reflective display device is about 1.2 to 2 times greater than that of a traditional reflective display device, which can overcome the problem of insufficient brightness when the traditional reflective display device displays a color image.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1:
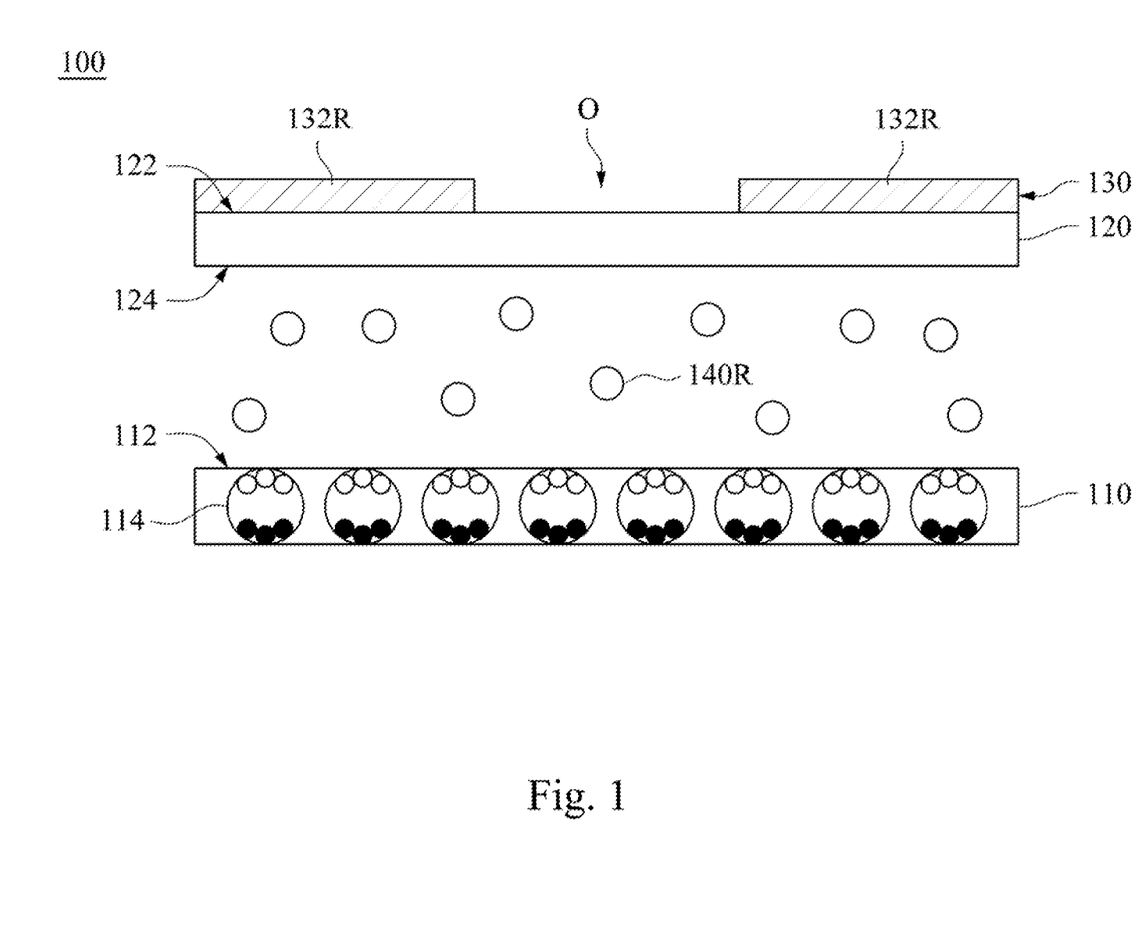
FIG. 1 is a cross-sectional view of a reflective display device according to one embodiment of the present disclosure.
Figure 2:
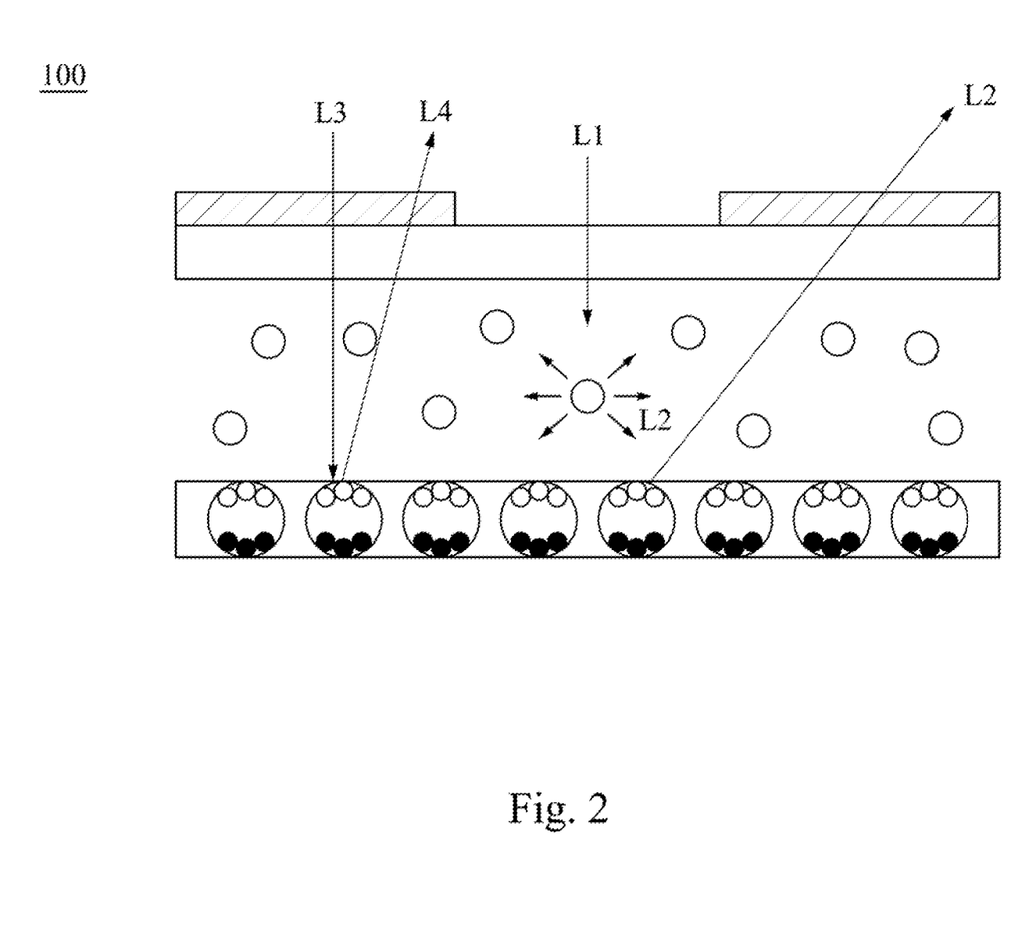
FIG. 2 is a schematic view of a light path of the reflective display device of FIG. 1 when being in operation.

FIG. 1 is a cross-sectional view of a reflective display device 100 according to one embodiment of the present disclosure. FIG. 2 is a schematic view of a light path of the reflective display device 100 of FIG. 1 when being in operation. As shown in FIG. 1 and FIG. 2, the reflective display device 100 includes an electrophoretic display (EPD) module 110, an optical layer 120, a color filter layer 130, and at least one quantum dot (QD) 140R. The optical layer 120 is located above the electrophoretic display module 110. The quantum dot 140R is located between the optical layer 120 and the electrophoretic display module 110. The color filter layer 130 is located on the optical layer 120. A top surface 122 of the optical layer 120 faces toward the color filter layer 130, and a bottom surface 124 of the optical layer 120 faces toward the quantum dot 140R. A top surface 112 of the electrophoretic display module 110 faces toward the quantum dot 140R. Moreover, the electrophoretic display module 110 may include a plurality of microcapsules 114 (or microcups). The quantum dot 140R is located above the microcapsules 114 (or microcups). When the white particles of the microcapsules 114 are at upper positions and the black particles of the microcapsules 114 are at lower positions, the microcapsules 114 may reflect light. For example, when a first light L1 passes through the optical layer 120 and transmits to the quantum dot 140R, the quantum dot 140R can emit a second light L2, and the electrophoretic display module 110 having the microcapsules 114 (or microcups) is configured to reflect the second light L2 to irradiate outwards from the color filter layer 130.

In this embodiment, the color filter layer 130 includes at least one color resist 132R, and the color resist 132R may be red, such that light passing through the color resist 132R is red light. The diameter of the quantum dot 140R may be in a range from 4 nm to 5 nm, and is configured to emit red light, such as the second light L2. Furthermore, the quantum dot 140R can absorb light having a wavelength in a range from 380 nm to 420 nm, such as 400 nm. In another embodiment, the color resist 132R may be replaced with a green color resist, a blue color resist, or a yellow color resist, and the quantum dot 140R may be replaced with a quantum dot having another diameter to emit green light, blue light, or yellow light, as deemed necessary by design.

In this embodiment, the color resist 132R may has an opening O to expose the optical layer 120, thereby increasing the transmittance of incident light to improve brightness. For example, the opening O of the color resist 132R may enable the first light L1 to pass through, in which the wavelength of the first light L1 may be greater than 400 nm. In addition, the fill rate of the color resist 132R on the optical layer 120 is in a range from 40% to 80% so as to form the suitable number or area of the openings O.

Specifically, since the reflective display device 100 has the quantum dot 140R that is between the optical layer 120 and the electrophoretic display module 110, when the first light L1 (i.e., incident light) passes through the optical layer 120 and transmits to the quantum dot 140R, the quantum dot 140R can emit the second light L2 (e.g., red light) having a specific wavelength, and the second light L2 can be reflected by the electrophoretic display module 110 below the quantum dot 140R, such that the second light L2 is reflected to irradiate outwards from the color filter layer 130. The configuration of the quantum dot 140R may increase the light transmitting to the electrophoretic display module 110 (e.g., 30% to 50% of the first light L1), thereby improving the reflectivity of the entire reflective display device 100 (e.g., 12% to 20% of the first light L1). The reflectivity of the reflective display device is about 1.2 to 2 times greater than that of a traditional reflective display device, which can overcome the problem of insufficient brightness when the traditional reflective display device displays a color image.

In some embodiments, when the first light L1 passing through the opening O of the color resist 132R, another third light L3 may pass through the color resist 132R and simultaneously enter the reflective display device 100. The third light L3 may be reflected by the electrophoretic display module 110 to form fourth light L4, and the fourth light L4 passes through color resist 132R to irradiate outwards. The second light L2 merely passes through the color resist 132R one time, and thus the brightness of the second light L2 is greater than that of the fourth light L4, thereby effetely improving the brightness of the entire reflective display device 100. In this embodiment, for example, the range of the wavelength of the first light L1 is greater than 400 nm, the wavelength of the third light L3 is in a range from 375 nm to 800 nm, and the present disclosure is not limited to this regard.

It is to be noted that the connection relationships, the materials, and the advantages of the elements described above will not be repeated in the following description. In the following description, other types of reflective display devices will be explained.

Figure 3:
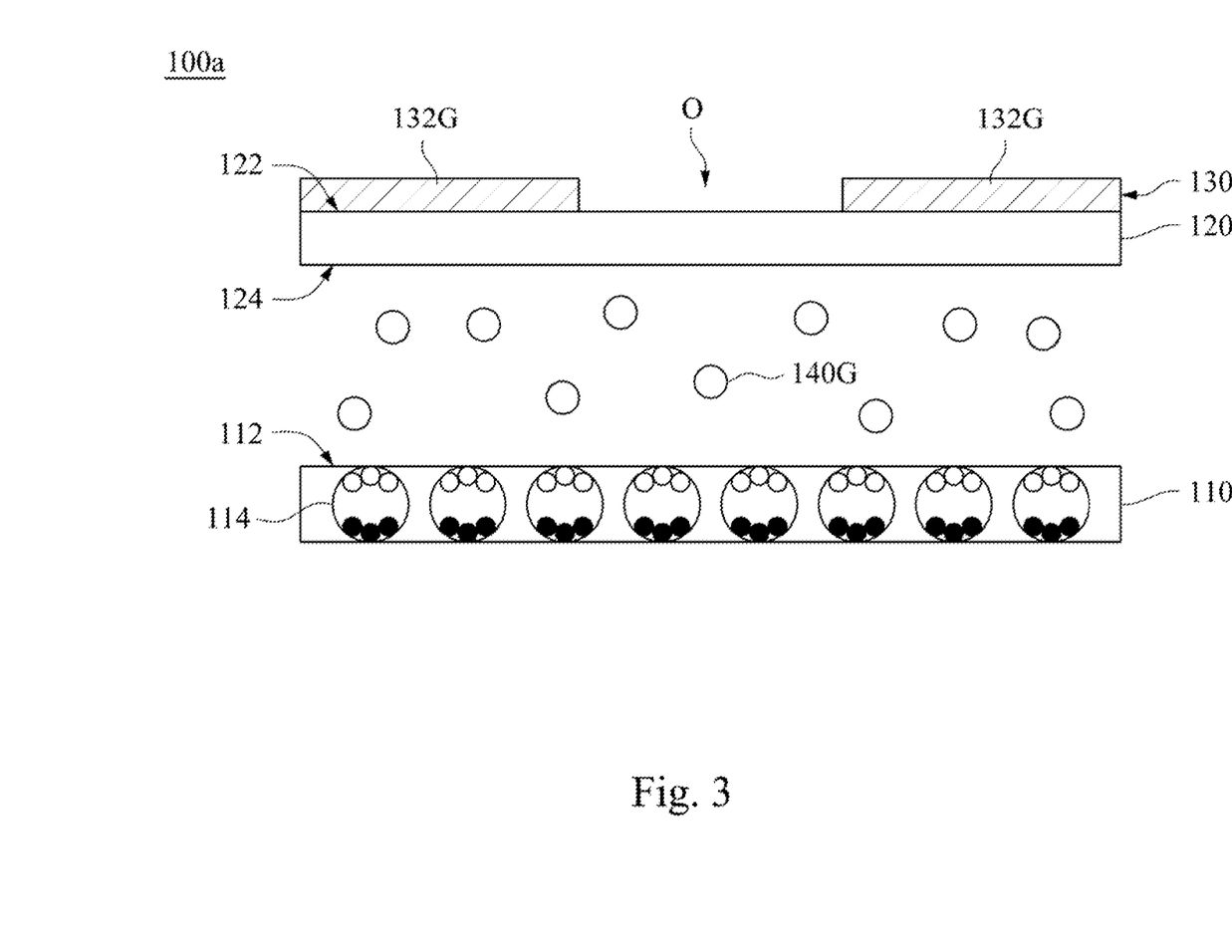
FIG. 3 is a cross-sectional view of a reflective display device according to one embodiment of the present disclosure.

FIG. 3 is a cross-sectional view of a reflective display device 100a according to one embodiment of the present disclosure. As shown in FIG. 3, the reflective display device 100a includes the electrophoretic display module 110, the optical layer 120, the color filter layer 130, and at least one quantum dot 140G. The difference between this embodiment and the embodiment of FIG. 1 is that the color filter layer 130 has a green color resist 132G, such that light passing through the color resist 132G is green light. Moreover, the diameter of the quantum dot 140G is in a range from 2.8 nm to 3.2 nm, and is configured to emit green light. The operation method of the reflective display device 100a is similar to that of the reflective display device 100 shown in FIGS. 1 and 2, and will not be described again.

Figure 4:
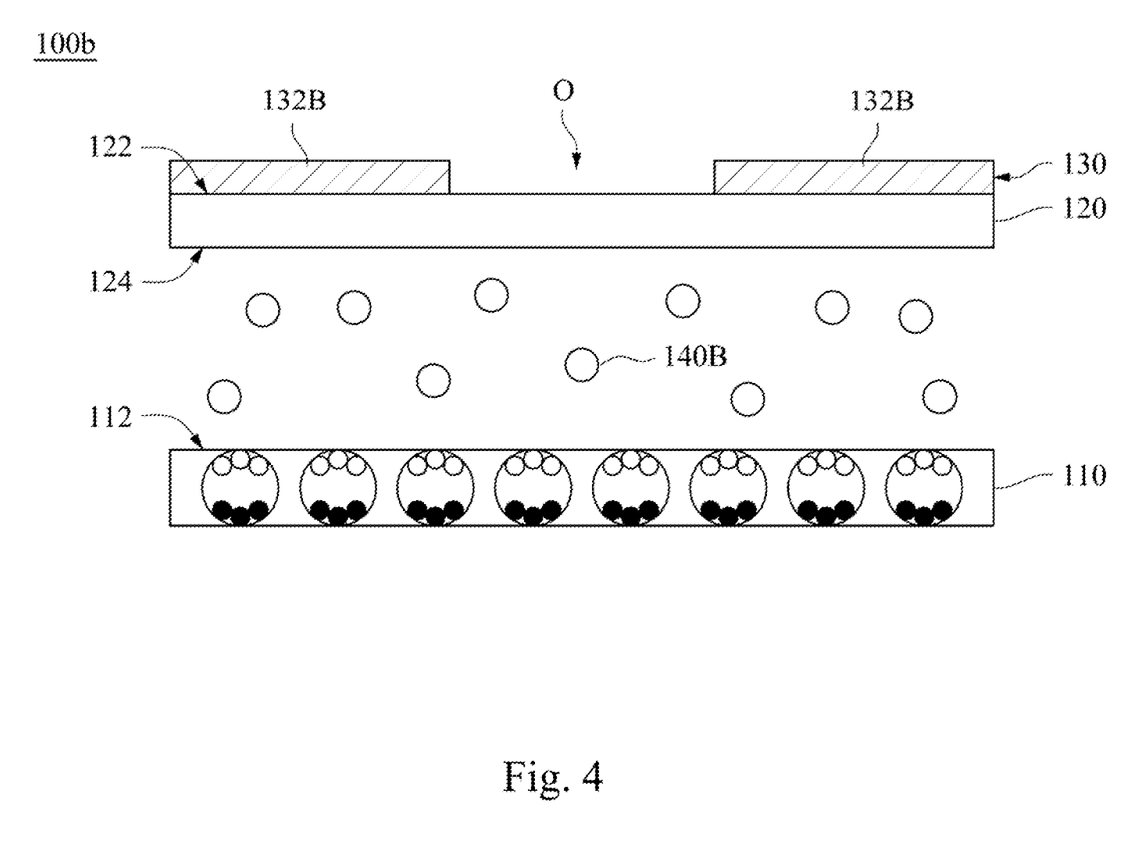
FIG. 4 is a cross-sectional view of a reflective display device according to one embodiment of the present disclosure.

FIG. 4 is a cross-sectional view of a reflective display device 100b according to one embodiment of the present disclosure. As shown in FIG. 4, the reflective display device 100b includes the electrophoretic display module 110, the optical layer 120, the color filter layer 130, and at least one quantum dot 140B. The difference between this embodiment and the embodiment of FIG. 1 is that the color filter layer 130 has a blue color resist 132B, such that light passing through the color resist 132B is blue light. Moreover, the diameter of the quantum dot 140B is in a range from 1.8 nm to 2.2 nm, and is configured to emit blue light. The operation method of the reflective display device 100b is similar to that of the reflective display device 100 shown in FIGS. 1 and 2, and will not be described again.

Figure 5:
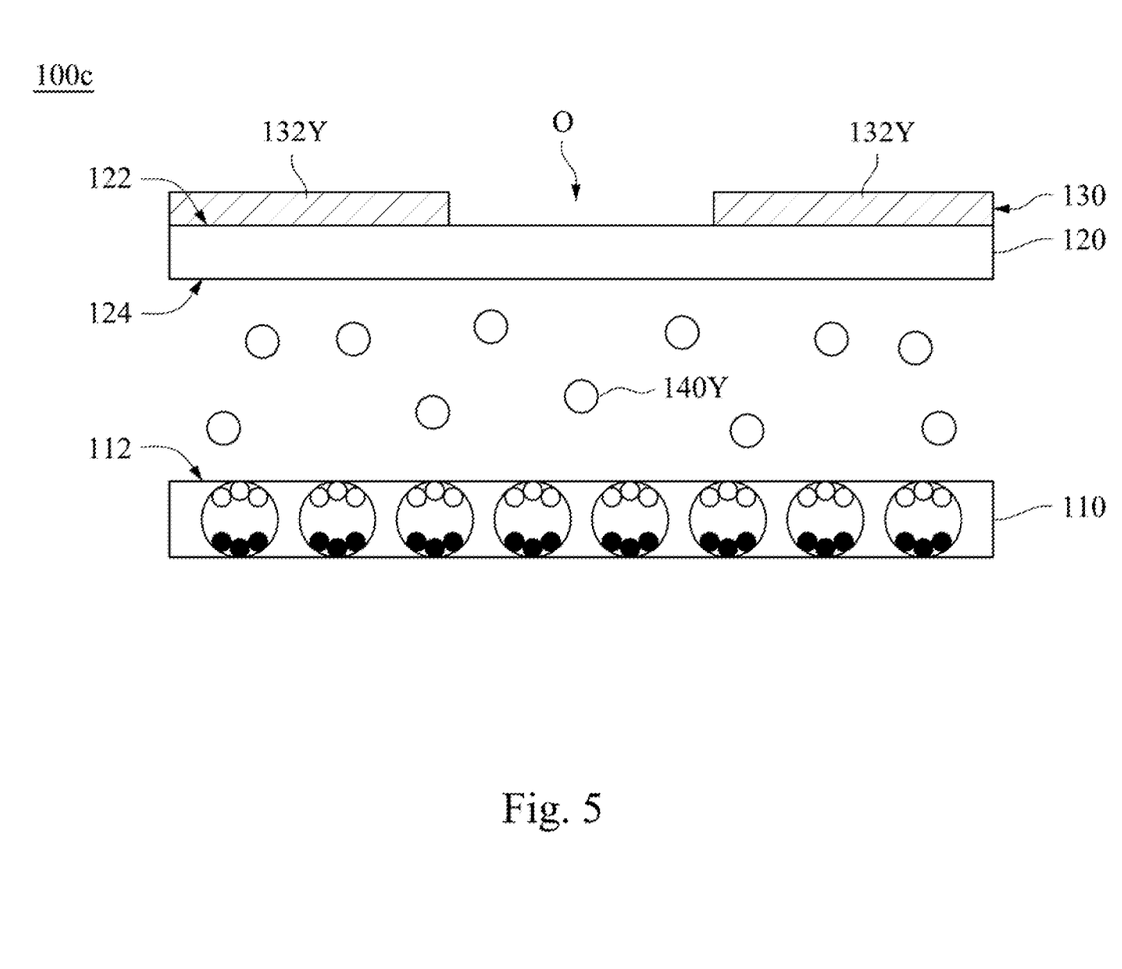
FIG. 5 is a cross-sectional view of a reflective display device according to one embodiment of the present disclosure.

FIG. 5 is a cross-sectional view of a reflective display device 100c according to one embodiment of the present disclosure. As shown in FIG. 5, the reflective display device 100c includes the electrophoretic display module 110, the optical layer 120, the color filter layer 130, and at least one quantum dot 140Y. The difference between this embodiment and the embodiment of FIG. 1 is that the color filter layer 130 has a yellow color resist 132Y, such that light passing through the color resist 132Y is yellow light. Moreover, a specific diameter range of the quantum dot 140Y may be selected to emit yellow light. The operation method of the reflective display device 100c is similar to that of the reflective display device 100 shown in FIGS. 1 and 2, and will not be described again.

Figure 6:
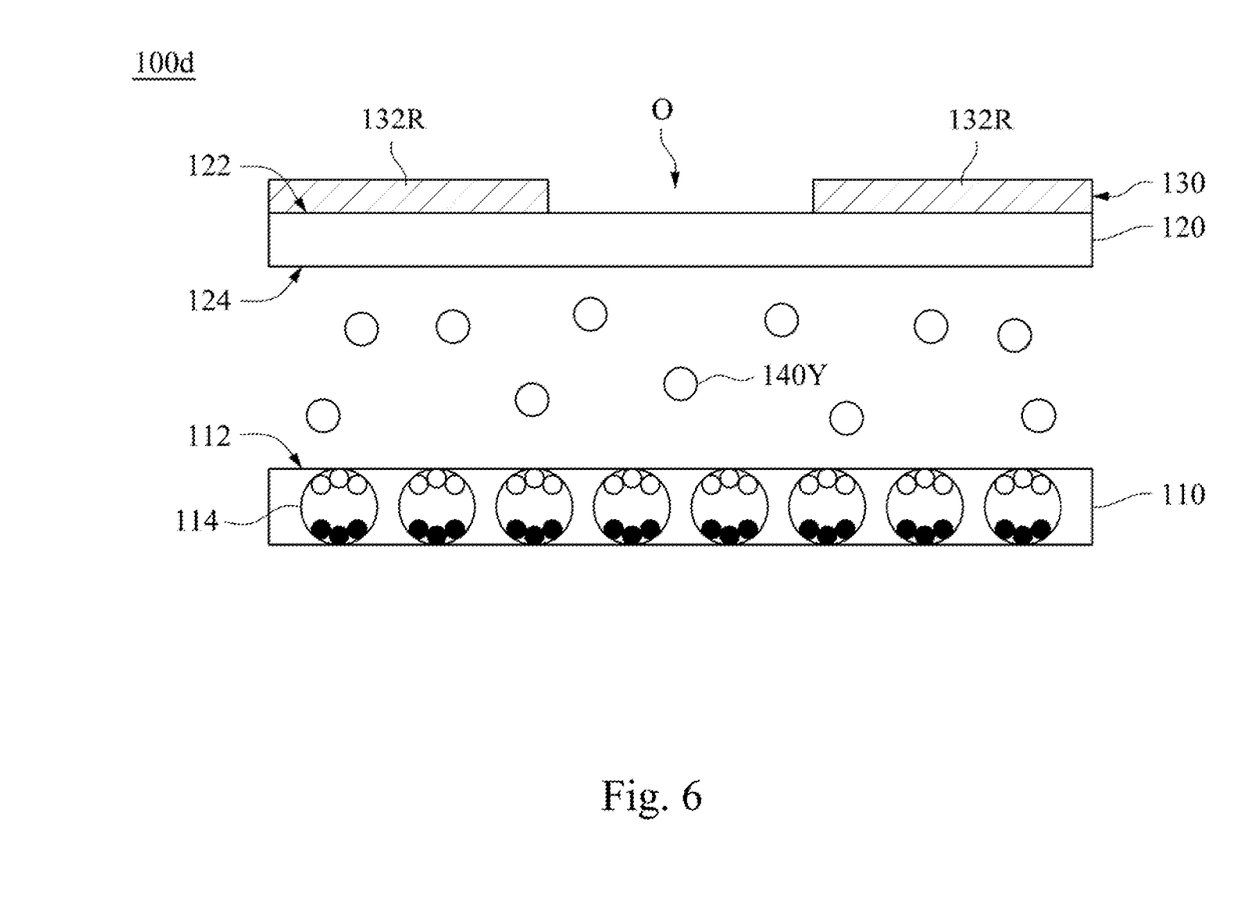
FIG. 6 is a cross-sectional view of a reflective display device according to one embodiment of the present disclosure.
Figure 7:
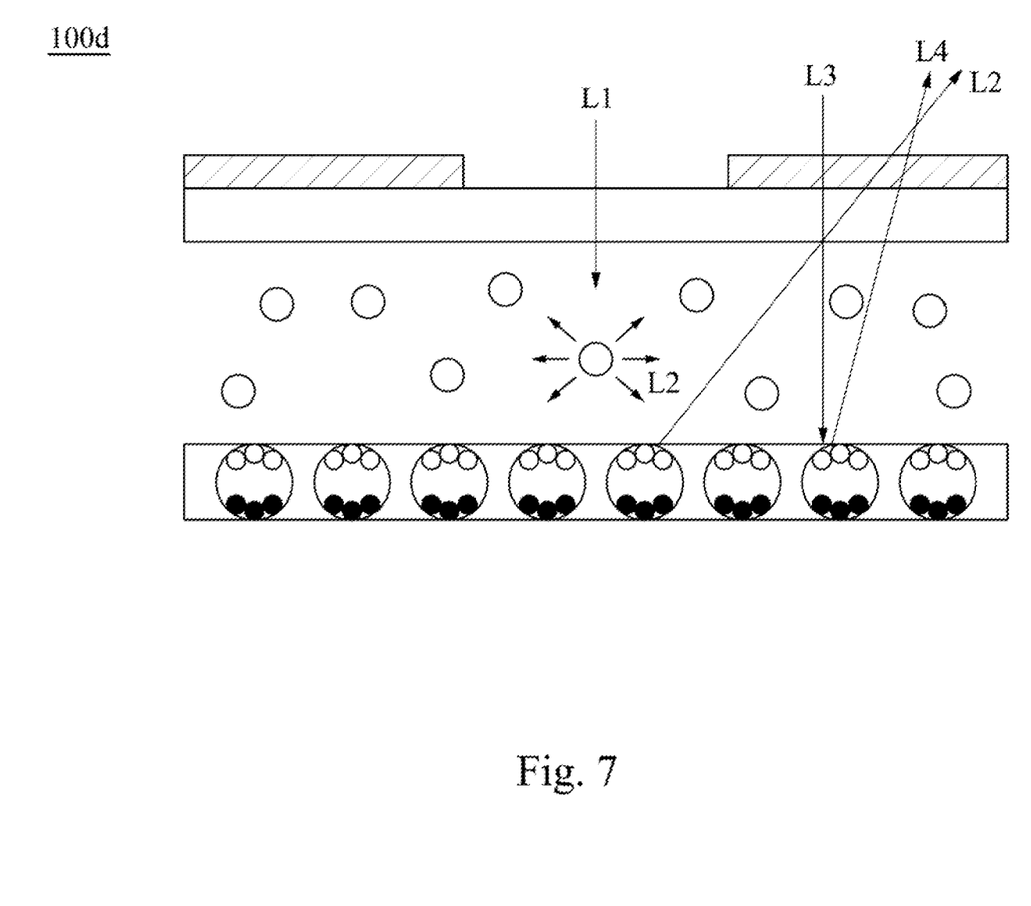
FIG. 7 is a schematic view of a light path of the reflective display device of FIG. 6 when being in operation.

FIG. 6 is a cross-sectional view of a reflective display device 100d according to one embodiment of the present disclosure. FIG. 7 is a schematic view of a light path of the reflective display device 100d of FIG. 6 when being in operation. As shown in FIG. 6 and FIG. 7, the reflective display device 100d includes the electrophoretic display module 110, the optical layer 120, the color filter layer 130, and at least one quantum dot 140Y. The difference between this embodiment and the embodiment of FIG. 1 is that the quantum dot 140Y capable of emitting yellow light is used to replace the quantum dot 140R capable of emitting red light.

Since the red color resist 132R of the color filter layer 130 would absorb a lot of light and has a small overlapping area with green light in spectrum, it is traditionally difficult to mix red light and yellow light. In this embodiment, when the first light L1 (i.e., incident light) passes through the opening O of the color resist 132R and the optical layer 120, and transmits to the quantum dot 140Y, the quantum dot 140Y can emit yellow light (e.g., the second light L2), and the second light L2 can be reflected by the electrophoretic display module 110 below the quantum dot 140Y, such that the second light L2 is reflected to irradiate outwards from the color filter layer 130. Furthermore, another third light L3 may pass through the color resist 132R and simultaneously enter the reflective display device 100d. The third light L3 may be reflected by the electrophoretic display module 110 to form the fourth light L4, and the fourth light L4 passes through color resist 132R to irradiate outwards. The red fourth light L4 and the yellow second light L2 may be mixed to transmit to human eyes, thereby achieving the reflective display device 100d capable of mixing red light and yellow light, which can improve product competitiveness.

Figure 8:
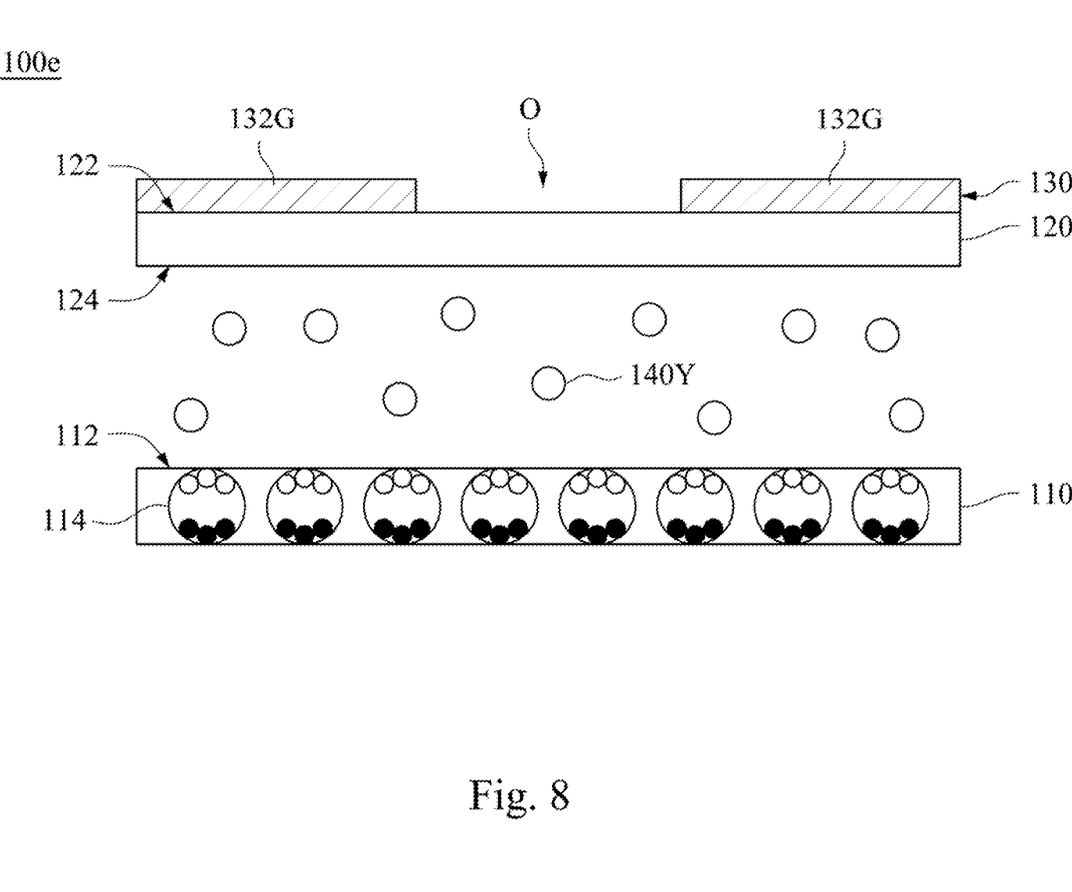
FIG. 8 is a cross-sectional view of a reflective display device according to one embodiment of the present disclosure.
Figure 9:
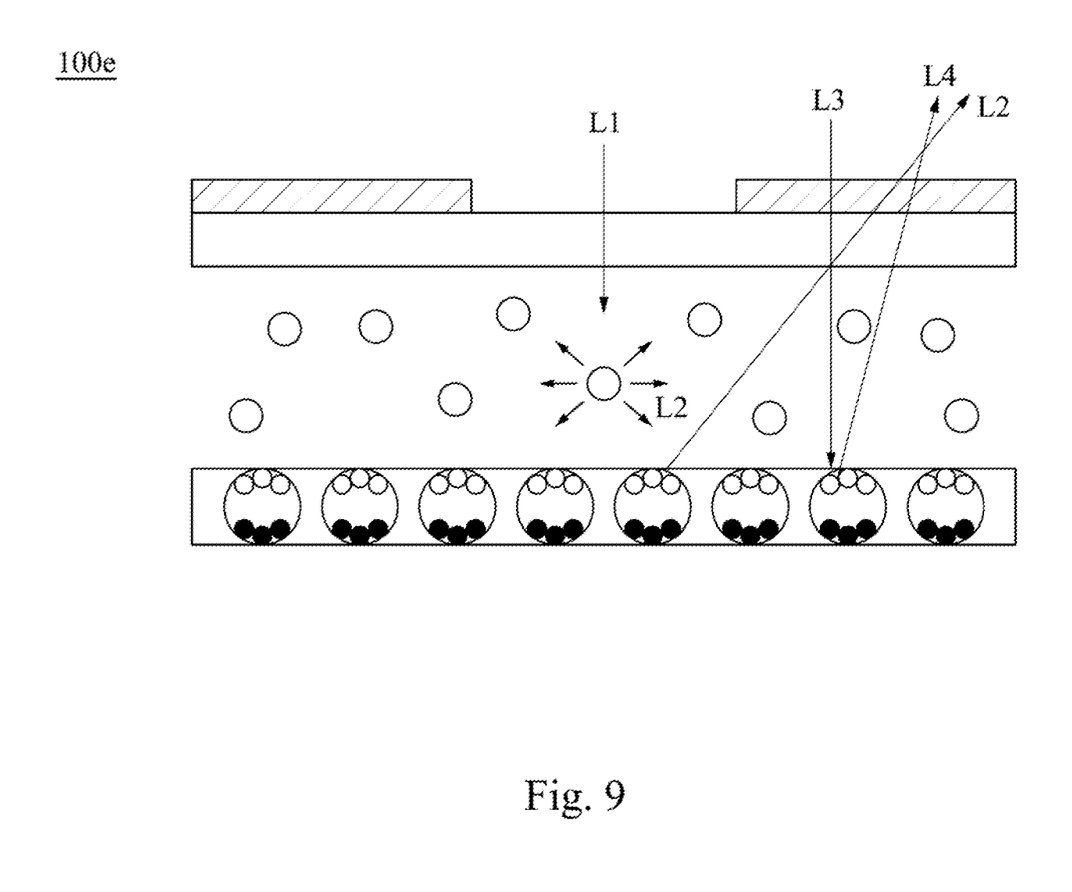
FIG. 9 is a schematic view of a light path of the reflective display device of FIG. 8 when being in operation.

FIG. 8 is a cross-sectional view of a reflective display device 100e according to one embodiment of the present disclosure. FIG. 9 is a schematic view of a light path of the reflective display device 100e of FIG. 8 when being in operation. As shown in FIG. 8 and FIG. 9, the reflective display device 100e includes the electrophoretic display module 110, the optical layer 120, the color filter layer 130, and at least one quantum dot 140Y. The difference between this embodiment and the embodiment of FIG. 3 is that the quantum dot 140Y capable of emitting yellow light is used to replace the quantum dot 140G capable of emitting green light.

Since the green color resist 132G of the color filter layer 130 has a small overlapping area with red light in spectrum, it is traditionally difficult to mix green light and yellow light. In this embodiment, when the first light L1 (i.e., incident light) passes through the opening O of the color resist 132G and the optical layer 120, and transmits to the quantum dot 140Y, the quantum dot 140Y can emit yellow light (e.g., the second light L2), and the second light L2 can be reflected by the electrophoretic display module 110 below the quantum dot 140Y, such that the second light L2 is reflected to irradiate outwards from the color filter layer 130. Furthermore, another third light L3 may pass through the color resist 132G and simultaneously enter the reflective display device 100e. The third light L3 may be reflected by the electrophoretic display module 110 to form the fourth light L4, and the fourth light L4 passes through color resist 132G to irradiate outwards. The green fourth light L4 and the yellow second light L2 may be mixed to transmit to human eyes, thereby achieving the reflective display device 100e capable of mixing green light and yellow light, which can improve product competitiveness.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A reflective display device, comprising:
an electrophoretic display module comprising a plurality of microcapsules or a plurality of microcups;
an optical layer located above the electrophoretic display module;
a color filter layer located on the optical layer and having at least one color resist, wherein the color resist has an opening to expose the optical layer; and
at least one quantum dot located between the optical layer and the electrophoretic display module, and located above the microcapsules or the microcups, wherein an orthogonal projection of the quantum dot on the electrophoretic display module is located within an orthogonal projection of the opening of the color resist on the electrophoretic display module, and when a first light passes through the opening of the color resist and the optical layer and transmits to the quantum dot, the quantum dot emits a second light, and the electrophoretic display module is configured to reflect the second light to irradiate outwards from the color filter layer.

2. The reflective display device of claim 1, wherein a fill rate of the color resist on the optical layer is in a range from 40% to 80%.

3. The reflective display device of claim 1, wherein the color resist is red, green, blue, or yellow.

4. The reflective display device of claim 3, wherein when the color resist is red, a diameter of the quantum dot is in a range from 4 nm to 5 nm.

5. The reflective display device of claim 3, wherein when the color resist is blue, a diameter of the quantum dot is in a range from 1.8 nm to 2.2 nm.

6. The reflective display device of claim 1, wherein the quantum dot is configured to absorb a light having a wavelength in a range from 380 nm to 420 nm.

7. A reflective display device, comprising:
an electrophoretic display module comprising a plurality of microcapsules or a plurality of microcups;
an optical layer;
a color filter layer located on a top surface of the optical layer and comprising at least one color resist, wherein the color resist has an opening to expose the optical layer; and
at least one quantum dot located between a bottom surface of the optical layer and the electrophoretic display module, and located above the microcapsules or the microcups, wherein an orthogonal projection of the quantum dot on the electrophoretic display module is located within an orthogonal projection of the opening of the color resist on the electrophoretic display module, and when a first light passes through the opening of the color resist and the optical layer and transmits to the quantum dot, the quantum dot emits a second light, and the electrophoretic display module is configured to reflect the second light to irradiate outwards from the color filter layer.

8. The reflective display device of claim 7, wherein a fill rate of the color resist on the optical layer is in a range from 40% to 80%.

9. The reflective display device of claim 7, wherein the color resist is red, green, blue, or yellow.

10. The reflective display device of claim 9, wherein when the color resist is red, a diameter of the quantum dot is in a range from 4 nm to 5 nm.

11. The reflective display device of claim 9, wherein when the color resist is blue, a diameter of the quantum dot is in a range from 1.8 nm to 2.2 nm.

12. The reflective display device of claim 7, wherein the quantum dot is configured to absorb a light having a wavelength in a range from 380 nm to 420 nm.

* * * * *